United States Patent
Tsukamoto et al.

[11] Patent Number: 5,433,514
[45] Date of Patent: Jul. 18, 1995

[54] PRESSURE CONTROL ACTUATOR FOR A BRAKE CONTROL SYSTEM

[75] Inventors: Masahiro Tsukamoto; Takayuki Watanabe, both of Yokosuka, Japan

[73] Assignee: Nissan Motor Co., Ltd., Yokohama, Japan

[21] Appl. No.: 208,711

[22] Filed: Mar. 11, 1994

[30] Foreign Application Priority Data

Mar. 16, 1993 [JP] Japan ................................. 5-081529

[51] Int. Cl.$^6$ .......................... B60T 8/00; B60T 11/00
[52] U.S. Cl. ............................... 303/113.2; 303/115.2
[58] Field of Search ............... 303/115.2, 113.1, 113.2; 180/197

[56] References Cited

U.S. PATENT DOCUMENTS

| | | | |
|---|---|---|---|
| 4,691,813 | 9/1987 | Dittner et al. | 303/115.2 |
| 4,717,211 | 1/1988 | Dittner | 303/115.2 |
| 4,950,028 | 8/1990 | Harrison | 303/115.2 |
| 5,143,429 | 9/1992 | Higashimata et al. | 303/115.2 |
| 5,188,436 | 2/1993 | Devall | 303/115.2 |

FOREIGN PATENT DOCUMENTS

| | | | |
|---|---|---|---|
| 2211921 | 9/1973 | Germany | 303/115.2 |
| 4025677 | 2/1992 | Germany | 303/115.2 |
| 3-167058 | 7/1991 | Japan . | |
| 2188111 | 9/1987 | United Kingdom | 303/115.2 |

*Primary Examiner*—Matthew C. Graham
*Attorney, Agent, or Firm*—Foley & Lardner

[57] ABSTRACT

A pressure control actuator suitable for an automotive brake control system comprises a pressure-regulation cylinder slidably enclosing a piston and cooperative with the piston for defining therein a variable-volume pressure chamber which is fluidly connected to a wheel cylinder, a shut-off valve through which the variable-volume chamber is connected to a master cylinder, a motor-driven thrust generator drivingly connected to the piston for producing a thrust, and a heavily pre-loaded return spring for biasing the piston in a first direction opposite to a second direction in which the piston is pushed by the master-cylinder pressure shut-up in the chamber, when the piston is displaced apart from its neutral position in the second direction so that the volume of the chamber is enlarged. A pre-load of the spring is set to balance with a force acting on the piston by a maximum master-cylinder pressure introduced into the chamber. In the absence of thrust acting on the piston after termination of the ABS pressure-reduction control, the piston quickly and precisely returns to the neutral position. Zero-thrust ensures a quick recovery of the piston to the neutral position at the aid of light braking action after termination of the TCS pressure-intensifying control.

6 Claims, 7 Drawing Sheets

PRESSURE CONTROL ACTUATOR FOR A BRAKE CONTROL SYSTEM

BACKGROUND OF THE INVENTION

1. Field of the Invention

The present invention relates to a pressure control actuator and specifically to an automotive brake control system with a fluid-pressure control actuator which is suitably utilized for both an anti-skid brake control and a traction control.

2. Description of the Prior Art

Recently, there have been proposed and developed various pressure control actuators, such as a fluid-pressure operated pressure control actuator and a powered piston-type pressure control actuator. An anti-lock brake system equipped with such a conventional powered piston-type pressure control actuator has been disclosed in Japanese Patent First Publication (Tokkai Heisei) No. 3-167058 (corresponding to U.S. Pat. application No. 07/438,174, filed on Nov. 16, 1989. The above-mentioned prior-art piston-type pressure control actuator is shown in FIG. 7. One set of the powered piston-type pressure control actuator is provided at each of vehicle wheel cylinders.

Referring now to FIG. 7, the conventional anti-lock brake system includes a first shut-off valve 53 connected through its first port K to an outlet port of a master cylinder 52 and a pressure regulating cylinder unit (actuator) 54 connected through its upper variable-volume chamber 55 to a second port L of the first shut-off valve 53. In a conventional manner, the master cylinder 52 produces a master-cylinder pressure based on an amount of depression of a brake pedal 51. The pressure regulating cylinder unit 54 includes a substantially cylindrical housing 56 having three-stepped cylindrical bores, namely an upper bore 56a having a relatively large inside diameter, an intermediate bore 56b having a relatively medium inside diameter and a lower bore 56c having a relatively small inside diameter. The cylindrical housing 56 slidably encloses a first piston 58 in the upper bore 56a. The upper bore 56a defines the upper variable-volume chamber 55 in conjunction with the first piston 58. The first piston 58 is normally biased in a lowermost spring-set position by the bias of a return spring 65, so that the bottom of the piston 58 abuts a stepped portion between the two consecutive bores 56a and 56b. The cylinder unit 54 includes a guide cylinder 61 disposed in the intermediate bore 56b. The guide cylinder 61 slidably encloses therein a second push-rod type piston 59, such that the upper end of the second piston 59 is abutable with the bottom surface of the first piston 58. A lower variable-volume chamber 60 is defined between the first piston 58 and the guide cylinder 61. Reference numerals 57, 62 and 63 denote oil seals to prevent oil leakage between the inner wall of the housing 56 and the outer periphery of the first piston 58, between the inner periphery of the guide cylinder 61 and the outer periphery of the second piston 59, and the outer periphery of the guide cylinder 61 and the inner wall of the housing 56, respectively. The first piston 58 operably encloses therein a check valve 64 to permit fluid flow from the lower chamber 60 to the upper chamber 55 and to prevent back-flow therethrough back to the lower chamber 60. The check valve 64 is opened by means of an upper semi-spherical projection 59a integrally formed on the upper flat end of the second piston 59. An additional spring 66 is operably disposed in the lower chamber 60 to bias the first piston 58 upwards and to bias the guide cylinder 61 downwards so that the guide cylinder 61 is maintained in its lowermost position. As compared with the spring 65, a spring constant of the additional spring 66 is set to a smaller value so that the first piston 58 is normally maintained in a neutral position (the lowermost position shown in FIG. 7). A motor-driven thrust generator 70 is provided at the lower end of the second piston 59. The thrust generator 70 comprises a reversible motor 67, a gear train 68, a worm shaft 69, and a ball guide nut 73. The worm shaft 69, the ball guide nut 73, the first and second pistons 58 and 59, the two springs 65 and 66, and the cylindrical housing 56 are axially aligned with each other. The worm shaft 69 engages the ball guide nut 73 by way of recirculating balls in order to permit both an axial movement and a rotational movement of the guide nut 73. Actually, since the guide nut 73 is splined to the bore 56c of the housing 56, rotation of the worm shaft 69 allows only the axial movement of the guide nut 73. The free end portion of the worm shaft 69 is operably enclosed in the cylindrical hollow 59b of the second piston 59, while the upper flat end of the guide nut 73 is rigidly connected to the flanged portion of the second piston 59C for axial movement therewith. The conventional anti-lock brake system illustrated in FIG. 7 includes a second shut-off valve 72 which is fluidly disposed between the second port L of the first shut-off valve 53 and an inlet-and-outlet port of a wheel cylinder 71. Each of the previously-noted first shut-off valve 53 and the second shut-off valve is traditionally comprised of a normally-open-type shut-off valve, such as a normally-open-type two-port two-position electromagnetic solenoid valve. The port of the wheel cylinder 71 is also connected through a slotted fluid passage 74 of the housing 56 to the lower chamber 60. Reference numeral 75 designates a brake controller which executes either an anti-skid brake control generally abbreviated as an "ABS control" or a traction control generally abbreviated as a "TCS control", depending on the vehicle driving condition. The controller 75 is connected to a wheel speed sensor 76 and a vehicle speed sensor (not shown) to derive a slippage of the road wheel on the basis of signal values generated by the sensors and to execute either the ABS control or the TCS control, based on the comparison results of the slippage to a threshold value. The controller 75 is connected to the two shut-off valves 53 and 72 to properly open and close the respective valve and further connected to the reversible motor 67 of the thrust generator 70 to generate axial thrust of the second piston 59 by clockwise or counterclockwise rotational movement of the motor 67.

During the ABS control, the controller 75 outputs a control signal to the second shut-off valve 72 to fully close the valve 72. Additionally, the first shut-off valve is kept opened. Upon termination of the shut-off operation of the second valve 72, the controller 75 drives the motor 67 to produce a downward displacement of the second piston 59, with the result that the check valve 64 is fully closed and the volume of the lower chamber 60 is enlarged, thereby resulting in a decrease in the wheel-cylinder pressure. In this manner, the braking force applied to the road wheel is effectively reduced at the ABS pressure reduction mode.

During the TCS control, the controller 75 outputs a control signal to the first shut-off valve 53 to fully close the valve 53. The second valve 72 is held opened. Upon termination of the shut-off operation of the first valve 53, the controller 75 drives the motor 67 to create an upward displacement of the second piston 59, with the result that the upper end of the second piston 59 is further projected into the second chamber 60 and consequently the first piston 58 is pushed upwards. The sum of the volume of the upper variable-volume chamber 55 and the volume of the lower variable-volume chamber 60 is decreased by a further projected portion of the piston 59. Accordingly, the wheel-cylinder pressure in the wheel cylinder 71 which is fluidly connected through the second valve 72 to the two chambers 55 and 60 is increased, thereby causing a properly increased braking force.

The conventional anti-lock brake system with the previously-noted pressure regulating actuator suffers from the drawback that two electromagnetic solenoid-type shut-off valves are required to control fluid flow to each wheel cylinder. In other words, the conventional anti-lock brake system requires at least eight shut-off valves per car. This results in high production costs. Additionally, the pressure regulating actuator incorporated in the conventional anti-lock brake system requires three oil seals 57, 62 and 63, for the purpose of preventing of oil leakage. Owing to a relatively large number of oil seals, a reliability to oil leakage is low.

Furthermore, the conventional anti-lock brake system has some problems concerning unstable control operations, during traction control, during normal braking, and during anti-skid brake control. For example, when the brake pedal is depressed during the traction control, the closed shut-off valve 53 is not shifted to the open position soon. In this case, the valve 53 is recovered to the full open position with a slight delay time. Such a delay time of valve-shift causes a slightly delayed brake timing.

During normal braking, it is necessary to prevent the second piston 59 from moving downwards by the master-cylinder pressure and to maintain the second piston 59 in its neutral position by way of electromagnetic braking action on the motor 67, thereby avoiding damper action of the piston 59 and resulting in effective braking effect. Such an electromagnetic brake is very expensive. Assuming that the above-mentioned electromagnetic brake is damaged under the open condition of the valves 53 and 72, there is a tendency for the second piston 59 to move downwards owing to the master-cylinder pressure. The downward stroke of the piston 59 prevents an increase in the wheel-cylinder pressure. In this case, an effective braking effect is not obtained.

In addition to the above, the prior-art pressure regulating actuator suffers from the drawback that it is difficult to precisely return the second piston 59 in the neutral position with a proper current control. For instance, In the event that the ABS control is terminated when the vehicle is running on a low frictional road surface such as wet or icy roads, the second shut-off valve 72 is shifted from the closed position to the open position, under depression of the brake pedal. Under this condition, assuming that the wheel-cylinder pressure is zero, the master-cylinder pressure tends to push the second piston 59 in the axially downward direction. To avoid the downward stroke of the piston 59, the motor 67 is driven by an extremely small current to such a degree that the piston 59 is not quickly but moderately moved upward. In order to achieve more accurate approach to the neutral position, the second piston 59 must be gradually and slowly returned to the neutral position. Thus, it takes a relatively long time necessary for recovery to the neutral position. Conversely, in the event that the ABS control is terminated when the vehicle is running on a high frictional road such as dry pavements, the wheel-cylinder pressure often remains at a pressure level above zero. In this case, since the second piston 59 is positioned in a lower position than the neutral position and in addition the upper end of the second piston 59 receives the wheel-cylinder pressure, a suitable current must be applied to the motor 67 such that the upper end of the second piston 59 abuts the bottom of the first piston 58 with relatively moderate upward movement of the piston 59. In practice, it is difficult to precisely return the piston 59 in the neutral position, since a proper current value necessary for return to the neutral position cannot be derived without input information, such as an actual master-cylinder pressure, an actual wheel-cylinder pressure, and an actual position of the piston 59. In the event that the vehicle travels on high and low friction roads alternately with depression of the brake pedal, the ABS control operation will be repeatedly executed. Assuming that the second piston 59 is positioned in its neutral position when the first ABS control is initiated, the first cycle of a pressure-reduction ABS control is certainly executed in accordance with a downward stroke started from the neutral position. However, upon initiation of the second ABS control, there is a great possibility that the second piston 59 offsets from the neutral position, owing to improper current control. For example, supposing that the second piston 59 is positioned at a lower level than the neutral position just before initiation of the second ABS control, the pressure regulating cylinder unit 54 cannot provide a downward stroke enough for pressure reduction during the second ABS control. In contrast, supposing that the second piston 59 is positioned at a higher level than the neutral position just before initiation of the second ABS control, the pressure regulating cylinder unit 54 cannot provide an optimal timing of pressure reduction, because the system takes a long time until the piston 59 reaches to the neutral position according to its downward stroke, and thus the check valve 64 is not yet closed.

On the other hand, when the brake pedal is depressed upon termination of the TCS control, the respective pistons 58 and 59 may not be completely shifted to their neutral positions, due to the delay time. Under these conditions, in the event that the ABS control is initiated, there are some problems, such as an unsatisfactory downward stroke or an undesired timing for pressure reduction, for the reasons indicated above.

SUMMARY OF THE INVENTION

Accordingly, it is an object of the invention to provide an improved pressure control actuator which avoids the foregoing disadvantages of the prior art.

It is another object of the present invention to provide a simple piston-type pressure control actuator which reliably gives both a pressure-reduction action and a pressure intensifying action and ensures a precise recovery of a piston to its neutral position.

It is a further object of the invention to provide an improved automotive brake control system with a simple piston-type fluid-pressure control actuator which can provide a reliable pressure regulating action via a piston stroke during an ABS control and during a TCS control.

In order to accomplish the aforementioned and other objects of the invention, a pressure control actuator fluidly disposed in a fluid-pressure line, comprises a shut-off valve fluidly disposed in the fluid-pressure line, the shut-off valve being responsive to a valve-open signal for establishing a fluid communication between upstream and downstream lines of the valve, and responsive to a valve-closing signal for blocking the fluid communication and for shutting up a fluid pressure in the downstream line, a pressure-regulation cylinder slidably accommodating therein a piston and cooperative with the piston for defining therein a variable-volume pressure chamber which is fluidly connected to the downstream line, a thrust generator drivingly connected to the piston for producing a thrust acting on the piston; and spring means for biasing the piston in a first axial direction opposite to a second axial direction in which the piston is pushed by a fluid pressure in the chamber, when the piston is shifted apart from its neutral position in the second axial direction so that the volume of the chamber is enlarged. A pre-load of the spring means is set to balance with a force acting on the piston by a maximum fluid pressure introduced into the chamber. The shut-off valve comprises an electromagnetic solenoid-type two-port two-position, normally-open valve. The thrust generator preferably comprises a motor-driven thrust generator which produces both a positive thrust acting in the first axial direction and a negative thrust acting in the second axial direction and has a worm shaft having a driven connection with recirculating balls and rigidly connected to a piston rod. The piston rod may comprise a stepped piston rod, and the spring means may include a return spring and a movable spring seat which seat is spring-loaded against a radially inwardly projecting annular shoulder formed on an inner wall of the cylinder by the pre-load of the spring. The piston is positioned in the neutral position by abutment between a stepped portion of the stepped piston rod and the spring seat abutting with the shoulder. The piston, the stepped piston rod, the movable spring seat, the spring, and the drive shaft are axially aligned to each other.

According to another aspect of the invention, an automotive brake control system comprises a master cylinder generating a master-cylinder pressure depending on a depression of a brake pedal, a wheel cylinder attached to each of road wheels for converting the master-cylinder pressure to a brake force, a slip-rate detection means for detecting a slip rate of the road wheel, and a motor-driven pressure control actuator. The actuator includes an electromagnetic solenoid-type shut-off valve fluidly disposed in a brake-fluid line, the shut-off valve having a first port communicating with the master cylinder via an upstream line and a second port communicating with the wheel cylinder via a downstream line, and the shut-off valve being responsive to a valve-open signal for establishing a fluid communication between the two ports and responsive to a valve-closing signal for blocking the fluid communication and for shutting up the master-cylinder pressure in the downstream line, a pressure-regulation cylinder slidably accommodating therein a piston and cooperative with the piston for defining therein a variable-volume pressure chamber which is fluidly connected to the downstream line, a reversible motor-driven thrust generator drivingly connected to the piston for producing a thrust acting on the piston; and spring means for biasing the piston in a first axial direction opposite to a second axial direction in which the piston is pushed by the master-cylinder pressure shut-up in the chamber, when the piston is shifted apart from its neutral position in the second axial direction so that the volume of the chamber is enlarged, a pre-load of the spring means being set to balance with a force acting on the piston by a maximum master-cylinder pressure introduced into the chamber. The brake control system also comprises a brake controller responsive to a driving condition of a vehicle for controlling the valve position of the valve and a direction and a magnitude of the thrust produced by the thrust generator. The brake controller generates the valve closing signal to shift the valve to the valve-closed position when the detected slip rate exceeds a predetermined first threshold, and generates the valve-open signal when the detected slip rate is less than a predetermined second threshold preset at a smaller value than the first threshold. When the detected slip rate exceeds the first threshold ($S_1$), in addition to shifting to the valve-closing position, the controller controls the thrust generator to produce the negative thrust acting on the piston in the second axial direction so that the wheel-cylinder pressure is reduced according to an increase in the volume of the chamber. On the other hand, when the detected slip rate exceeds the first threshold ($S_3$), in addition to shifting to the valve-closing position, the controller controls the thrust generator to produce the positive thrust acting on the piston in the first axial direction so that the wheel-cylinder pressure is increased according to a decrease in the volume of the chamber.

DESCRIPTION OF THE PREFERRED EMBODIMENTS

Figure 1:
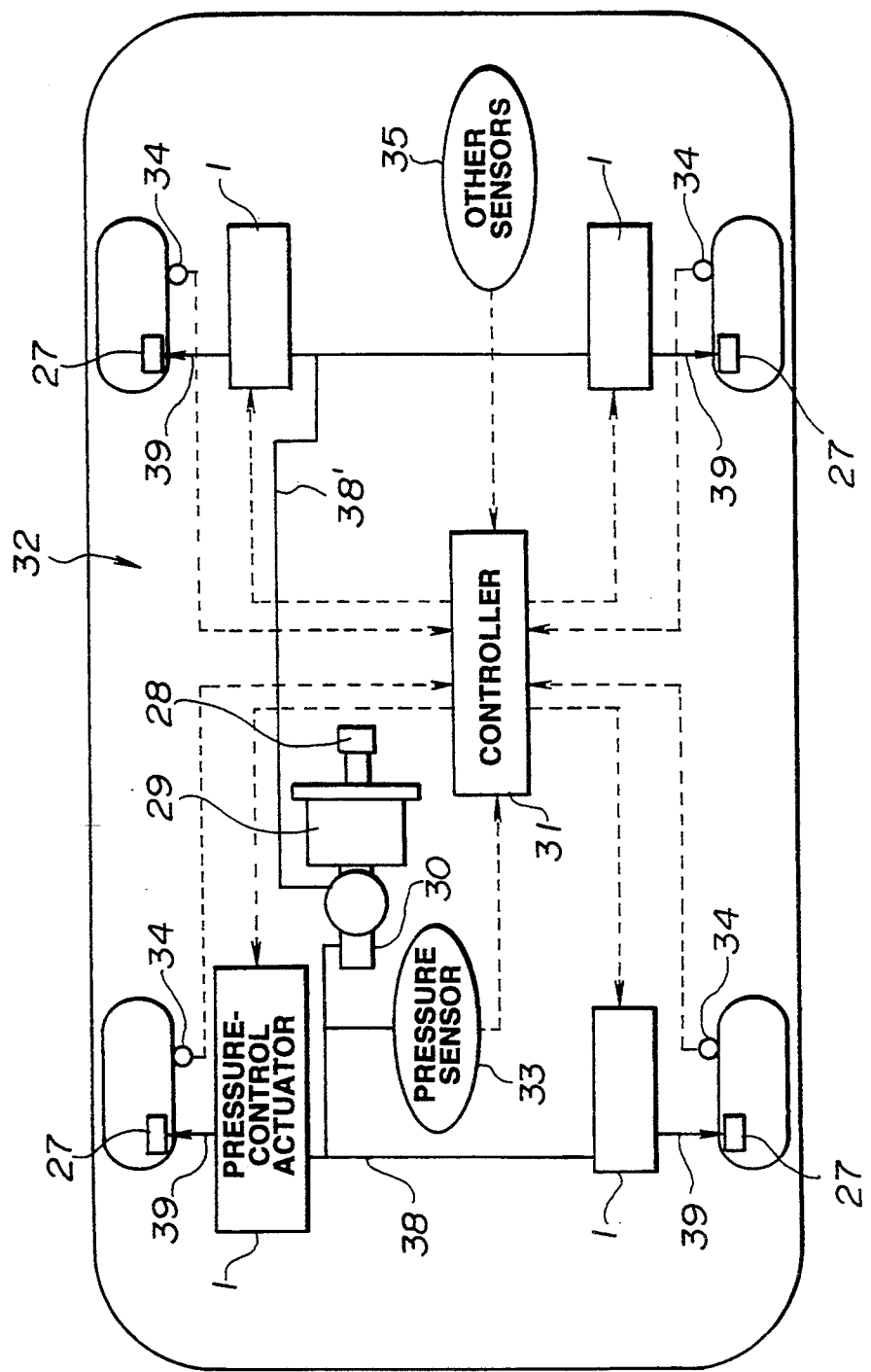
FIG. 1 is a schematic system diagram illustrating an automotive brake control system according to the invention.

Referring now to the drawings, particularly to FIG. 1, a pressure control actuator 1 of the embodiment is incorporated in an automotive brake control system 32. In FIG. 1, brake fluid lines are represented by solid lines, while signal lines are represented by broken lines. The brake control system 32 includes a master cylinder 30 with a brake booster 29 which is attached to the master cylinder 30 for producing a multiplied hydraulic pressure in the master cylinder 30 by a light pedal pressure applied onto a brake pedal 28. The system 32 includes four brake wheel cylinders 27 each being arranged at one of road wheels. Traditionally, the master cylinder 30 consists of a tandem master cylinder with two pistons, set in tandem. Thus, the hydraulic pressure in one pressure chamber defined in the master cylinder 30 is fluidly connected through brake lines 38 and 39 to the front wheel cylinders 27, while the hydraulic pressure in the other pressure chamber defined in the master cylinder 30 is fluidly connected through the brake lines 38' and 39 to the rear wheel cylinders 27. As seen in FIG. 1, the hydraulic system has been generally split into front and rear sections for the purpose of fail-safe in the brake system. In the front brakes, the two pressure control actuators 1 are fluidly disposed between the brake line 39 connected to the front-right wheel cylinder 27 and the first brake line 38 of the master-cylinder side and between the brake line 39 connected to the front-left wheel cylinder 27 and the first brake line 38, respectively. In the rear brakes, the two pressure control actuators 1 are fluidly disposed between the brake line 39 connected to the rear-right wheel cylinder 27 and the second brake line 38' of the master-cylinder side and between the brake line 39 connected to the rear-left wheel cylinder 27 and the second brake line 38'. As set forth above, the hydraulic system is split into front and rear sections in the embodiment. For the purpose of fail-safe in the brake system, one section may be constructed as a primary brake section in which one chamber of the master cylinder is connected to the front-right wheel cylinder and the rear-left wheel cylinder, while the other section may be constructed as a secondary brake section in which the other chamber in the master cylinder is connected to the front-left wheel cylinder and the rear-right wheel cylinder. The brake control system 32 includes a pressure sensor 33 which is connected to either one of the brake lines 38 and 38' for detecting a master-cylinder pressure. As seen in FIG. 1, the pressure sensor 33 is connected to the brake line 38. The system 32 also includes four wheel speed sensors 34, respectively provided at either one of the road wheels, for detecting a wheel speed of each road wheel. Reference numeral 35 designates the other sensors, such as a vehicle speed sensor, an acceleration sensor and the like. The vehicle speed sensor is provided for detecting an actual vehicle speed (a ground speed). The acceleration sensor is provided for detecting a longitudinal acceleration and/or a lateral acceleration, exerted on the vehicle body. A controller 31 is connected to the respective sensors through the signal lines for receiving input information, such as a vehicle speed data, wheel speed data at each road wheel, a master-cylinder pressure, and the like. Based on the input information, the controller 31 determines the driving condition of the vehicle, such as during acceleration slip or during deceleration slip, and controls the respective pressure control actuators 1, as hereinbelow described in detail. The controller 31 functions to derive a slip ratio by a formula [(the detected actual vehicle speed—the detected wheel speed)/(the detected actual vehicle speed)]. In general, the actual vehicle speed can be detected by the magnitude of the signal value generated by the vehicle speed sensor. The actual vehicle speed may be calculated as a mean value between signal values derived simultaneously from the four wheel speed sensors 34.

Figure 2:
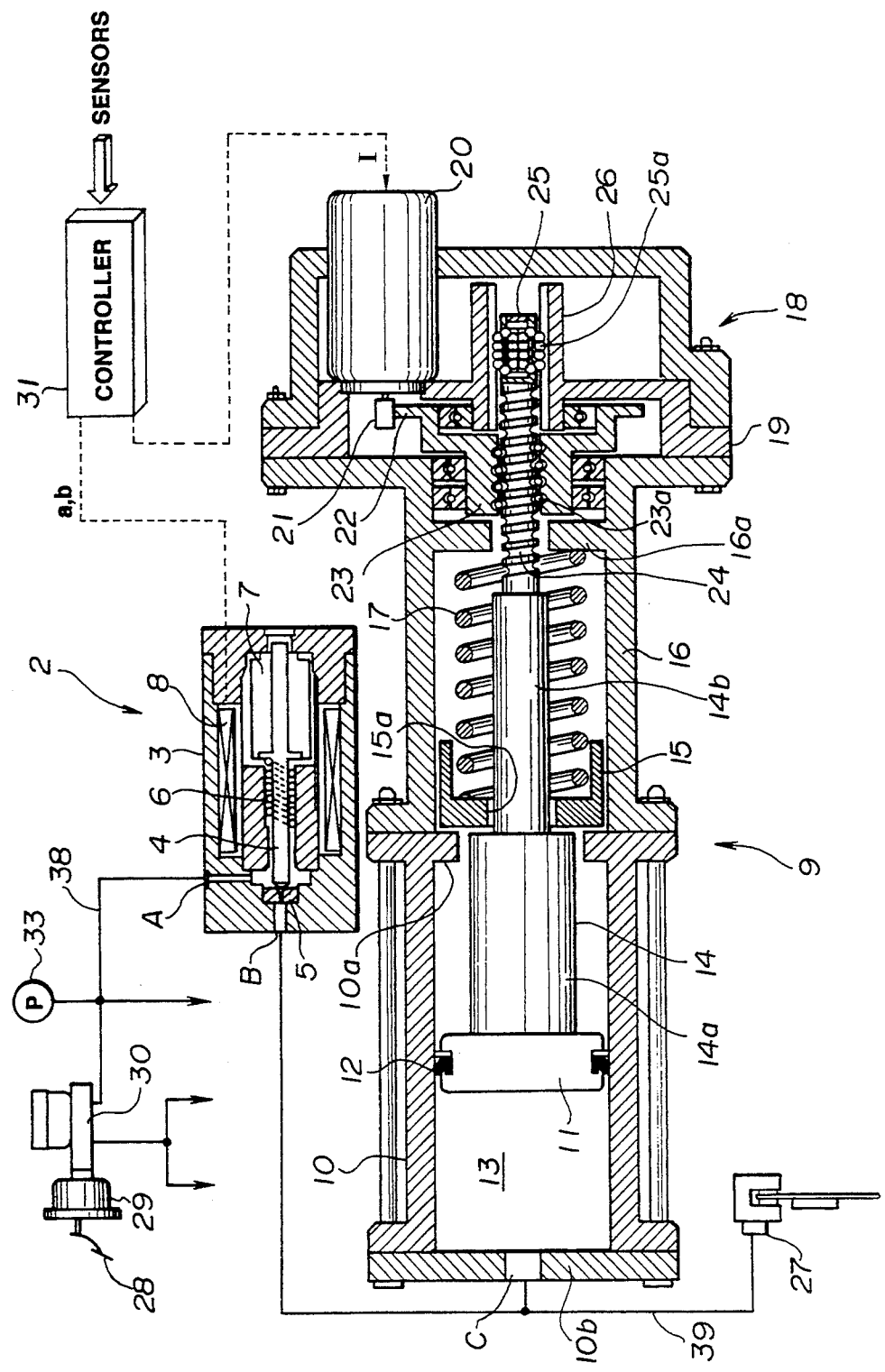
FIG. 2 is a longitudinal cross-sectional view illustrating a preferred embodiment of a pressure control actuator according to the invention.

Referring now to FIG. 2, there is shown the pressure control actuator 1. Since the pressure control actuators 1 connected to the four wheel cylinders are same, only one of the plurality of wheel brake control arrangement is shown, for the sake of illustrative simplicity. The pressure control actuator 1 consists of a shut-off valve 2 and a pressure control actuator assembly 9. The shut-off valve 2 includes a valve housing 3 defining therein a plunger chamber, a plunger 4 slidably enclosed in the plunger chamber of the valve housing, and a valve seat 5 for the conical valve portion of the plunger 4. The shut-off valve 2 includes a return spring 6 operably disposed around the outer periphery of the plunger 4 for constantly biasing the plunger 4 away from the valve seat 5. The valve 2 is usually maintained in a valve open position by the spring bias. As seen in FIG. 2 the valve 2 comprises a normally-open-type electromagnetic solenoid valve with an exciting coil 8. Reference numeral 7 denotes a magnet core that is attached onto the outer periphery of the plunger 4 to transmit attraction force caused by the coil 8 to the plunger 4. Thus, when the coil 8 is excited by a control signal from the controller 31, the solenoid valve 2 is activated, thereby causing the valve to shift to the valve closed position. The valve housing 3 is formed with two ports, namely a master-cylinder side port A connected to the brake outlet port of the master cylinder 30 and a wheel-cylinder side port B connected to the inlet-and-outlet port of the wheel cylinder 27. The port A is communicated with the port B through a fluid passage defined in the valve seat 5. In addition, the port A is connected through the line 38 to the master cylinder 30. When the valve 2 receives a valve-closing signal b from the controller, the solenoid valve is activated, with the result that the plunger 4 is moved in the axial leftward direction (viewing FIG. 2) to block the fluid communication between the ports A and B. When the solenoid valve 2 is deactivated in response to a valve-open signal a output by the controller 31, the plunger 4 is held in the rightmost position to establish a full fluid communication between the ports A and B.

On the other hand, the pressure control actuator assembly 9 includes a pressure-regulation cylinder 10, which defines therein a piston chamber, and a piston 11 slidably enclosed in the piston chamber. The left opening end of the cylinder 10 is hermetically closed by way of a lid 10b in a fluid-tight fashion. The lid 10b is formed with an inlet-and-outlet port C communicating the piston chamber. The port C is connected via the line 39 both to the port B and to the inlet-and-outlet port of the wheel cylinder 27. An oil seal 12 is attached onto the outer periphery of the piston 11 to prevent oil leakage between the piston 11 and the cylinder 10. A variable-volume chamber 13 is thus defined between the right end of the lid 10b and the left end of the piston 11. The maximum volume of the chamber 13, which volume is related to both the piston stroke and the inside diameter of the cylinder 10, is preset to a designated value enough to vary the brake pressure from zero to a predetermined maximum brake pressure, such as 120 $kgf/cm^2$, or vice versa. The piston 11 is rigidly connected to a stepped piston rod 14 which consists of a large-diameter rod portion 14a and a small-diameter rod portion 14b. The small-diameter rod portion 14b is rigidly connected to a worm shaft 24 of a motor-driven thrust generator 18 described later, to cause the piston to move axially by way of thrust created by the thrust generator 18 and consequently to increase and decrease the wheel-cylinder pressure by the axial movement of the piston 11. A return spring 17 such as a coil spring is operably provided in a spring chamber defined in a spring housing 16 to surround the outer periphery of the small-diameter rod portion 14b. As seen in FIG. 2, the spring 17 is actually disposed between a stationary spring seat 16a integrally formed with the spring housing 16 and an axially movable spring seat 15 slidably disposed in the spring chamber. The spring 17 serves to force the movable spring seat 15 toward a radially, inwardly projecting annular shoulder 10a of the cylinder 10. The movable spring seat 15 includes a central through-opening 15a through which the small-diameter rod portion 14b is inserted into the spring chamber. The inside diameter of the through-opening 15a is dimensioned to be greater than the outside diameter of the right-hand side rod section 14b and dimensioned to be smaller than the outside diameter of the rod portion 14a. In addition, the inside diameter of the annular shoulder 10a is dimensioned to be greater than the outside diameter of the rod portion 14a. A spring constant of the spring 17 is designed so that a leftward spring-bias axially acting on the piston 11 through the rod section 14a exceeds a rightward force which acts on the pressure-receiving surface (left end) of the piston 11 when the maximum master-cylinder pressure is produced. With the above-noted arrangement, the rightmost end of the rod section 14a normally lies flush with the right flat end of the annular shoulder 10a as shown in FIG. 2, since the left flat end of the movable spring seat 15 is constantly urged on the right end of the shoulder 10a by way of a high bias of the spring 17, irrespective of the magnitude of the master-cylinder pressure. The position of the piston 11 and the position of the spring 17, illustrated in FIG. 2, will be hereinafter referred to as a "neutral position" and as an "initial spring setting position", respectively. As appreciated from the above, during normal braking, the spring 17 remains at the initial spring-setting position irrespective of the magnitude of the master-cylinder pressure owing to its high spring-constant. Therefore, the rigidity of the actuator 1 against the brake pressure is not lowered but constantly maintained, during normal braking.

As seen in the right-hand side of FIG. 2, the motor-driven thrust generator 18 is arranged to cause an axial movement of the worm shaft 24. The thrust generator 18 includes a housing 19 and a reversible motor 20 attached to the housing 19. The motor has a drive pinion 21 exposing into the housing 19. The motor 20 is drivingly controlled by a drive current I generated by the controller 31. In a conventional manner, in reversible motors, the drive pinion .21 is rotatable in clockwise or counterclockwise directions depending on the direction of current I flowing through the motor. The magnitude of torque generated by the motor 20 can be in general varied in proportion to the value of current I applied to the motor 20. The worm shaft 24 engages a ball guide nut 23 through recirculating balls 23a to allow both an axial movement and a rotational movement of the worm shaft 24. The ball guide nut 23 is integrally formed with an outside ring gear 22 which meshes with the drive pinion 21. Since the gear 22 has a larger pitch-circle diameter as compared with the pinion 21, torque generated by the motor 20 is multiplied by a gear ratio of the gear 22 to the pinion 21, and as a result the multiplied torque is transmitted to the ball guide nut 23. The worm shaft 24 has a splined nut 25 at the rightmost end (viewing FIG. 2). Since the splined nut 25 engages an inner splined tube 26 integrally formed with the housing 19 by means of recirculating balls 25a, such spline-connection permits only the axial movement of the worm shaft 24 and prevents the rotational movement of the worm shaft. In this manner, thrust is applied through the ball guide nut 23 to the worm shaft 24. The magnitude of thrust is proportion to the magnitude of torque caused by the motor 20. In the actuator assembly 9, the piston 11, the stepped piston rod 14, the movable spring seat 15, the return spring 17, and the worm shaft 24 are axially aligned with each other, thereby eliminating undesirable lateral load acting on the piston 11 and ensuring the axial sliding movement of the piston 11.

The operation of the pressure control actuator 1 will be hereinbelow described on the basis of the current versus wheel-cylinder pressure characteristic graph of FIG. 3.

Figure 3:
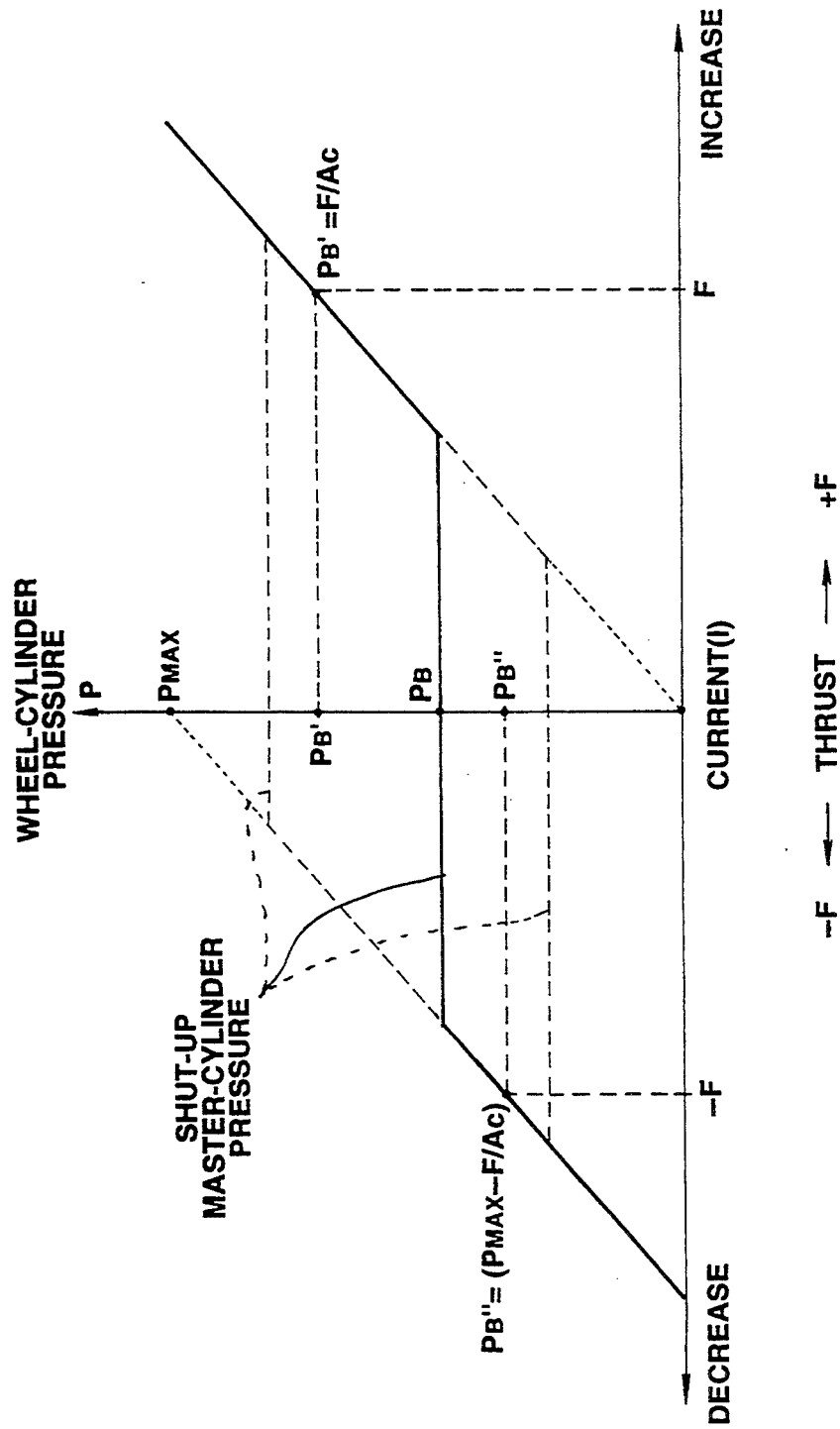
FIG. 3 is a graph illustrating a pressure-regulation characteristic of the pressure control actuator of the embodiment.

In a pressure-intensifying control as illustrated in the right half of FIG. 3, assuming that the shut-off valve 2 is closed when the master-cylinder pressure has been reached to a pressure level $P_B$, the pressure $P_B$ is shut up in the variable volume pressure chamber 13. In case that the value of current applied to the motor 20 is zero, the piston 11 receives the axial rightward force by the shut-up master-cylinder pressure $P_B$. The axial rightward force is represented by multiplying the pressure $P_B$ by the pressure receiving area AC of the piston 11. That is, the rightward force is equivalent to $P_B \times AC$. On the other hand, the magnitude of pre-load applied to the spring-loaded movable spring seat 15 is designed to be equal to or greater than the axial rightward force equivalent to the maximum master-cylinder pressure $P_{MAX}$. Actually, the magnitude of pre-load is pre-set essentially to a value represented by $P_{MAX} \times AC$. Under this condition, the return spring 17 is not contracted but remains at its initial spring-setting position, and as a result the wheel-cylinder pressure is also maintained at the pressure $P_B$. Thereafter, when the value of current I applied to the motor 20 is linearly increased from zero to gradually increase the magnitude of leftward thrust created by the thrust generator 18, the piston 11 is maintained in the neutral position illustrated in FIG. 2, until reaction from the spring seat 15 to the stepped piston rod 14 has reached to zero, i.e., the leftward thrust becomes equivalent to the rightward force $P_B \times AC$. Subsequently, when the leftward thrust exceeds the force $P_B \times AC$ according to the increase in the current value, the piston rod 14 moves leftwards and the piston also moves leftwards away from the spring seat 15, with the result that the shut-up pressure in the chamber 13, i.e., the wheel-cylinder pressure is linearly increased in proportion to the increase in the current value. For example, when the wheel-cylinder pressure (the shut-up pressure in the chamber 13) has approached to a pressure level $P_B'$, the value of pressure $P_B'$ is obtained by [the thrust F/the pressure receiving area AC], because the rightward force equivalent to the pressure $P_B'$ applied onto the pressure receiving surface of the piston 11 is balanced to the leftward force equivalent to the leftward thrust F applied to the piston rod 14. Since the thrust F is proportion to the value of current I, the actuator 1 maintains the shut-up pressure in the chamber 13, namely, the wheel-cylinder pressure constant, in case of the current value equivalent to a pressure level less than the shut-up pressure, that is, $P_B \times AC \geq F$, as shown in the horizontal solid line of the right half of the graph. On the other hand, in case of the current value equivalent to a pressure level above the shut-up pressure, namely $P_B \times AC < F$, the actuator 1 generates the increasingly regulated pressure in proportion to the value of the drive current I., as shown in the 45°-sloped solid line of the right half of FIG. 3.

In a pressure-reduction control as illustrated in the left half of FIG. 3, assuming that the shut-off valve 2 is closed when the master-cylinder pressure has been reached to a pressure level $P_B$, the pressure $P_B$ is shut up in the chamber 13. In case that the value of current applied to the motor 20 is zero, the piston 11 receives the axial rightward force equivalent to $P_B \times AC$. Under this condition, the return spring 17 is not contracted but remains at the initial spring-setting position, with the result that the wheel-cylinder pressure is also maintained at the pressure $P_B$. Thereafter, when the value of current I applied to the motor 20 is linearly reduced from zero to put the motor into reverse and consequently to increase the magnitude of rightward thrust $[-F]$ created by the thrust generator 18, the piston 11, on the one hand, receives the resultant force $[P_B \times AC + F]$ of the above-mentioned rightward thrust and the rightward force created by the shut-up pressure $P_B$ which acts on the pressure receiving surface of the piston 11. On the other hand, the piston receives the leftward force $[P_{MAX} \times AC]$ created by the spring 17. When the rightward force is smaller than or equal to the leftward force, that is, $[P_B \times AC + F] \leq [P_{MAX} \times AC]$, the spring 17 is not contracted. In proportion to the change in the current value, when the rightward thrust is increased and thus the rightward force exceeds the leftward force, i.e., $[P_B \times AC + F] > [P_{MAX} \times AC]$, the spring becomes contracted. In other words, the piston 11 starts to move rightwards from a particular time point when the thrust F becomes greater than the value $[(P_{MAX} - P_B) \times AC]$. According to the rightward movement of the piston 11, the shutup pressure in the chamber 13, i.e., the wheel-cylinder pressure is linearly reduced in proportion to the reduction in the current value. For example, when the wheel-cylinder pressure (the shut-up pressure in the chamber 13) has approached to a pressure level $P_B''$, the rightward force $[P_B'' \times AC + F]$ acting on the piston 11 is substantially balanced to the leftward force $[P_{MAX} \times AC]$ acting on the piston, because a rate of increase in the spring-bias of the spring 17 is negligible as compared with a rate of reduction of rightward force owing to pressure-reduction in the chamber 13 under the same rightward piston stroke. Therefore, the value of pressure $P_B''$ can be obtained approximately by the formula $[P_{MAX} - F/AC]$. Since the thrust is proportion to the current value, the actuator 1 maintains the wheel-cylinder pressure constant, in case of $(P_{MAX} - P_B) \times AC \geq F$, as shown in the horizontal solid line of the left half of the graph. On the other hand, in case of $(P_{MAX} - P_B) \times AC < F$, the actuator 1 generates the decreasingly regulated pressure in proportion to the value of the drive current I., as shown in the 45°-sloped solid line of the left half of FIG. 3. The operation of the brake control system 32 employing the previously-noted pressure control actuator 1 according to the invention will be hereinafter described in detail in accordance with the flow charts illustrated in FIGS. 4 through 6. The control operation is cyclically performed as an interrupt routine every predetermined period of time, under the turned-ON condition of the ignition switch, irrespective of the engine stall.

Figure 4:
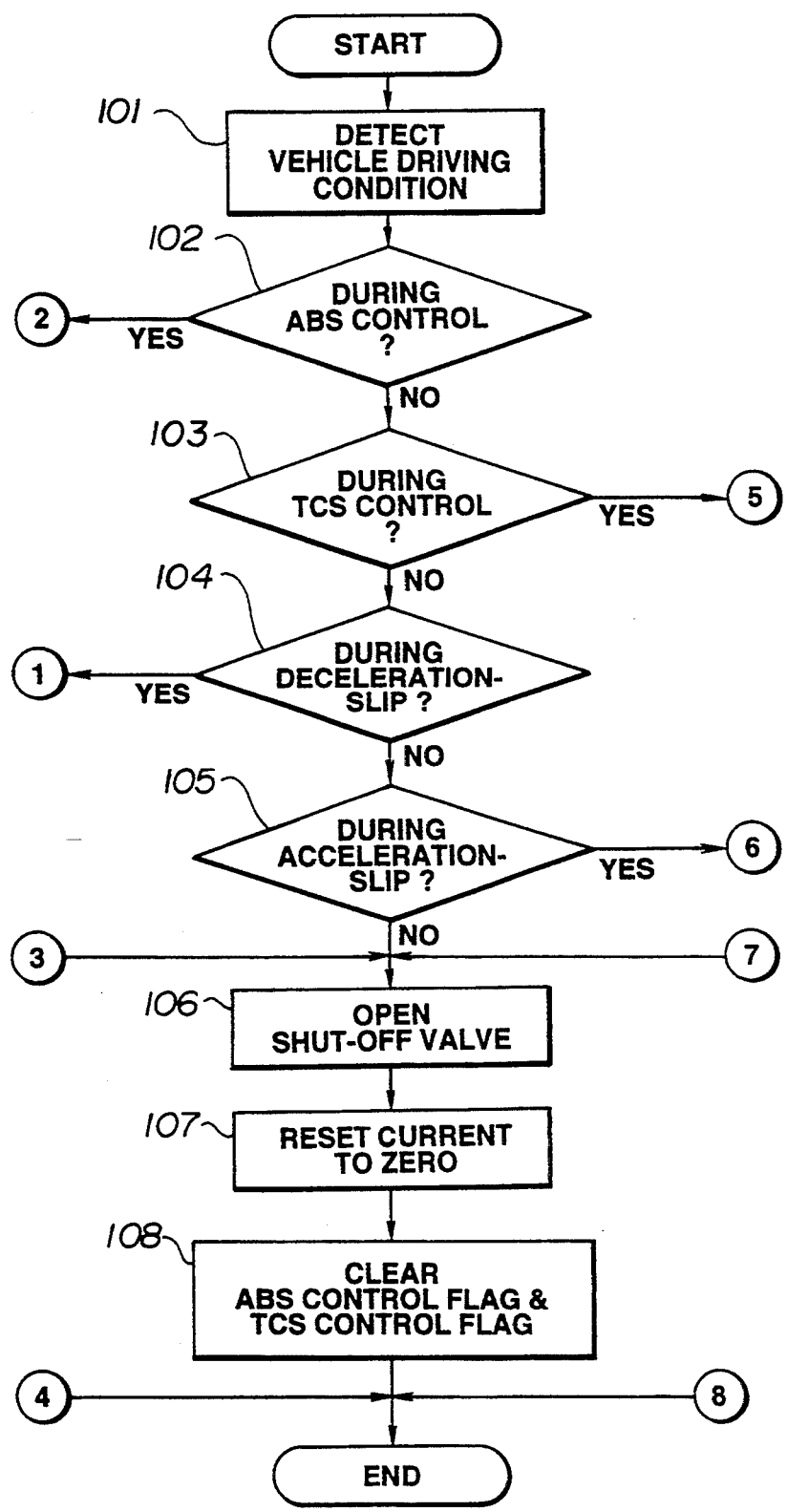
FIG. 4 is a flow chart illustrating a main control routine executed by the brake control system of the invention.

Referring now to FIG. 4, in step 101, the controller 31 determines the vehicle driving condition on the basis of the input information from the sensors. In step 102, a test is made to determine whether the ABS control is executed. When the answer to step 102 is negative (NO), i.e., the controller does not execute the ABS control, step 103 proceeds in which a test is made to determine whether the TCS control is executed. When the TCS control is not executed, step 104 proceeds in which the controller determines based on the slip rate of each wheel, whether the vehicle experiences skidding of the wheel. In other words, step 104 is necessary to determine whether the vehicle is in a so-called deceleration-slip state and consequently to determine whether the ABS control should be initiated. In step 104, the slip rate can be derived by a formula {[actual vehicle speed] − [wheel speed]}/[actual vehicle speed]. Under a complete skidding condition of the vehicle, the slip rate becomes 1.0. Under a perfect road-grip condition, theoretically, the slip rate is zero, because the wheel speed is equal to the actual vehicle speed. In general, when the slip rate exceeds a predetermined threshold $S_1$, it can be judged that skidding starts to develop at the road wheel having the slip rate above the threshold $S_1$. In this case, the ABS control is initiated. In the event that the vehicle is not put into wheel-skidding, step 105 proceeds in which the controller determines based on the negative slip rate of each driven wheel, whether the vehicle is in a so-called acceleration-slip state. If the answer to step 105 is negative, the controller judges that the vehicle is in a normal driving state wherein the ABS control and the TCS control are unnecessary. That is to say, step 105 is necessary to determine whether the TCS control should be initiated. Thereafter, in step 106, the controller 31 outputs the signal a to the shut-off valve 2 so as to maintain it at the valve-open position. In the preferred embodiment, the controller 31 generates the signal a only when the slip rate is less than a second threshold $S_2$ preset at a smaller value than the threshold $S_1$, in order to avoid chattering of the valve 2. In step 107, the controller 31 set the current value I to zero. In step 108, an ABS control flag and a TCS control flag are both cleared. Through a series of steps 101 to 108, the master-cylinder pressure is transmitted via the shut-off valve 2 directly to the wheel cylinder 27, with the result that braking force is applied to the road wheel depending on the depressing amount of the brake pedal 28.

Figure 5:
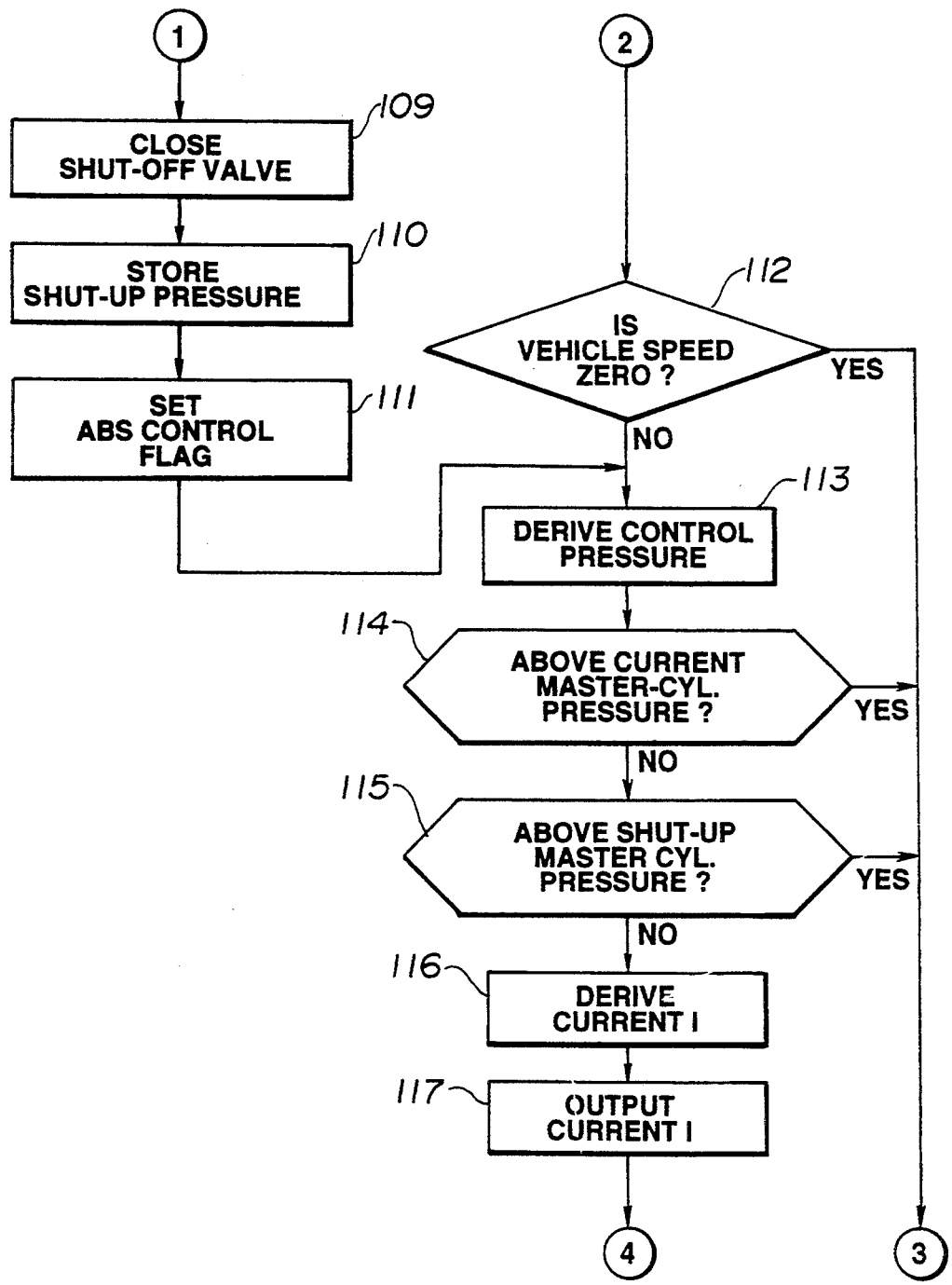
FIG. 5 is a flow chart illustrating a subroutine corresponding to an anti-skid brake control routine.

When the answer to step 104 is affirmative (YES), the ABS control is initiated. FIG. 5 shows a sub-routine branched from the main routine illustrated in FIG. 4. The sub-routine shown in FIG. 5 corresponds to an anti-skid brake control routine.

Referring now to FIG. 5, step 109 proceeds in response to the affirmative answer at step 104. In step 109, the controller 31 outputs the signal b to shift the shut-off valve 2 in the valve closed position. Upon the valve 2 is fully closed, the master-cylinder pressure is shut up in the line 39, the variable volume chamber 13 of the actuator 1, and the wheel cylinder 27. As a result, a further pressure-rise in the wheel cylinder is prevented. Subsequently to step 109, step 110 enters in which the controller 31 stores the shut-up master-cylinder pressure in its memories. In step 111, the ABS control flag is set to flag that the vehicle is brought into the ABS control.

Returning to step 102 shown in FIG. 4, in the event that the answer to step 102 is in the affirmative, i.e., during the ABS control, step 112 shown in FIG. 5 proceeds in which a test is made to determine whether the actual vehicle speed is zero. When the actual vehicle speed is zero, i.e., the vehicle stops, the control procedure jumps to step 106 to terminate the unnecessary ABS control.

Subsequently to step 111, or in case of the judgment that the vehicle speed exceeds zero in step 112, step 113 proceeds in which the controller 31 derives a value of pressure to be regulated and controlled by the actuator 1. The controlled pressure value is derived so that the slip rate of the road wheel becomes within a preselected slip-rate range, for example within upper and lower limits which are predetermined on the basis of such a slip rate as is optimal to provide maximum effective braking. In step 114, a test is made to determine whether the command value of controlled pressure is a higher level than a currently-detected master-cylinder pressure. In the event that the command value of controlled pressure exceeds the current master-cylinder pressure, it can be judged that the brakes are released just after initiation of the ABS control or that the coefficient of friction of the road surface becomes increased just after initiation of the ABS control. In this case, since the vehicle tends to be decelerated to a greater degree than the controlled-pressure command value, the ABS pressure-reduction control is unnecessary. Therefore, in case of the affirmative answer at step 114, the control procedure returns to step 106 to terminate the ABS control. Conversely, in case of the negative answer at step 114, that is, when the controlled-pressure command value is less than the current master-cylinder pressure, step 115 proceeds in which a test is made to determine whether the controlled-pressure command value exceeds the shut-up master-cylinder pressure stored in the controller 31. In step 115, in the event that the controlled-pressure command value exceeds the shut-up master-cylinder pressure, it can be judged that the brake pedal 28 is additionally depressed and the coefficient of friction of the road surface is increased just after initiation of the ABS control. If the actuator 1 is operated in accordance with the controlled-pressure command value, the actuator will act to increase the wheel-cylinder pressure on the basis of the command value. Actually, since the pressure accumulated in the master cylinder 30 is enough to increase the wheel-cylinder pressure, the accumulated master-cylinder pressure eliminates the necessity of the pressure-intensifying action by way of the actuator 1. In case of the affirmative answer at step 115 as well as step 114, the control procedure jumps to step 106 to temporarily stop the ABS control. After this, when the slip rate exceeds the predetermined threshold $S_1$ at step 104, the ABS control is initiated again.

In step 115, when the command value of controlled pressure is less than the shut-up master-cylinder pressure, the ABS control is operated in a pressure reduction mode in which the wheel-cylinder pressure is reduced to the command value of controlled pressure through steps 116 and 117. In step 116, the value of drive current I applied to the motor 20 is calculated according to the left-half of the graph shown in FIG. 3. In step 117, the motor 20 is driven according to the calculated current value to produce the desired rightward thrust of the worm shaft 24 and consequent to cause the rightward movement of the piston 11. Accordingly, the volume of the variable volume chamber 13 is increased and as a result the wheel-cylinder pressure is reduced to effectively decrease the slip rate of the skidding wheel. In this manner, one cycle of the ABS control is brought to an end.

When the answer to step 105 is in the affirmative, the TCS control is initiated. In step 105, the slip rate can be represented as a negative slip rate derived by a formula {[actual vehicle speed] − [wheel speed]}/[actual vehicle speed]. Alternatively, the slip rate can be represented as a positive slip rate derived by a formula {[wheel speed] − [actual vehicle speed]}/[wheel speed], because the wheel speed exceeds the actual vehicle speed during acceleration slip. Under a complete wheel-spin condition of the vehicle, the slip rate becomes 1.0. Under a perfect road-grip condition, theoretically, the slip rate is zero, because of the wheel speed identical to the actual vehicle speed. In general, when the slip rate exceeds a predetermined threshold $S_3$, it can be judged that wheel-spin starts to develop at the driven wheel having the slip rate above the threshold $S_3$. In this case, the TCS control is initiated. The sub-routine shown in FIG. 6 corresponds to a traction control routine.

Figure 6:
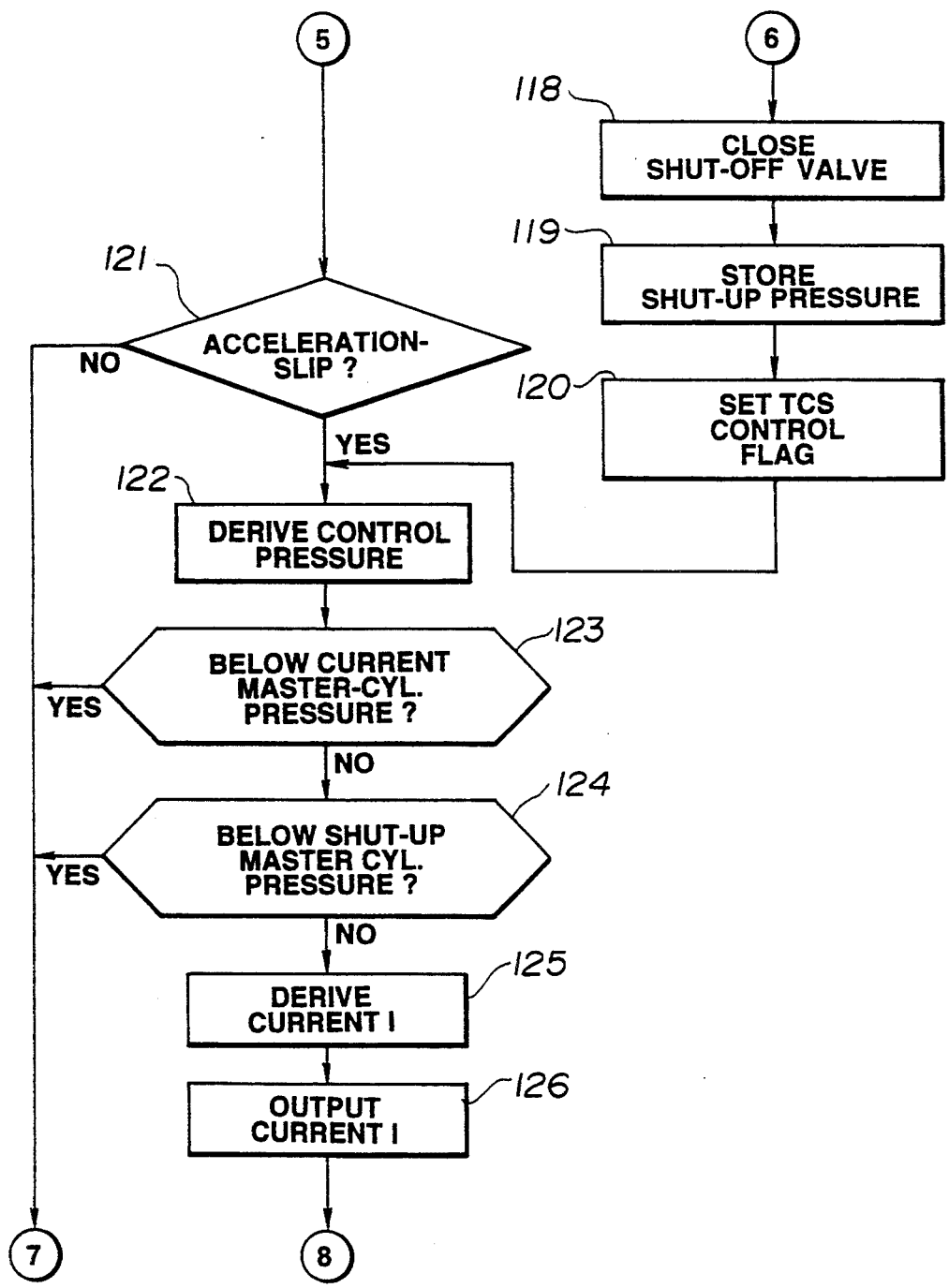
FIG. 6 is a flow chart illustrating a subroutine corresponding to a traction control routine.
Figure 7:
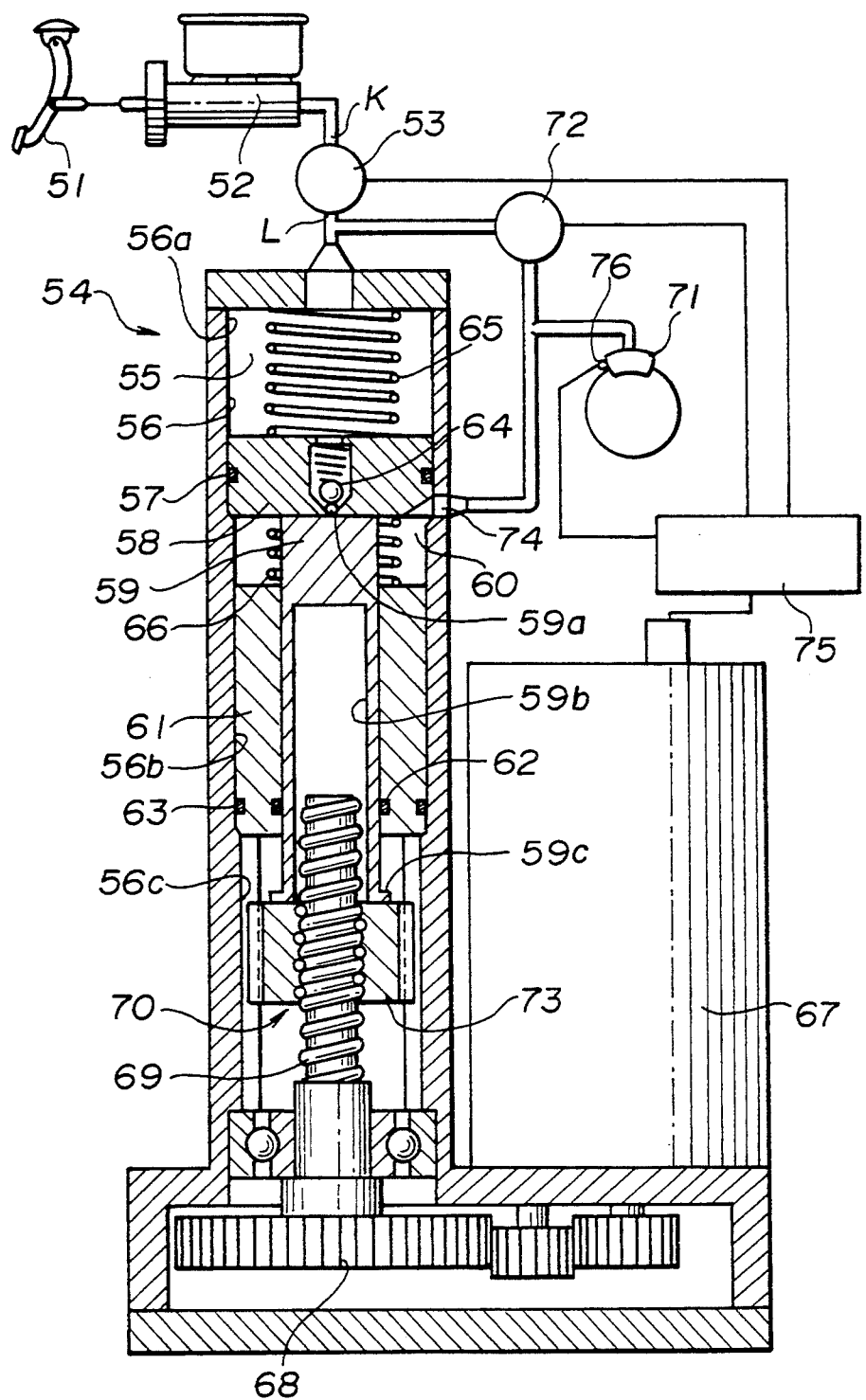
FIG. 7 is a system diagram illustrating a conventional anti-lock brake control system with a motor-driven piston-type fluid-pressure regulating actuator partly sectioned.

Referring now to FIG. 6, step 118 proceeds in response to the affirmative answer at step 105. In step 118, the controller 31 outputs the signal b to shift the shut-off valve 2 in the valve closed position. Upon the valve 2 is fully closed, the master-cylinder pressure is shut up in the line 39, the variable volume chamber 13 of the actuator 1, and the wheel cylinder 27. During acceleration-slip, the shut-up master-cylinder pressure becomes almost zero. Subsequently to step 118, step 119 proceeds in which the controller 31 stores the shut-up master-cylinder pressure in its memories. In step 120, the TCS control flag is set to flag that the vehicle is brought into the TCS control.

Returning to step 105 shown in FIG. 4, in the event that the answer to step 103 is in the affirmative, i.e., the vehicle is put into the TCS control, step 121 shown in FIG. 6 proceeds in which a test is made to determine whether the vehicle experiences wheel-spin at the driven wheel, owing to excessive acceleration. When the wheel-spin does not occur, the control procedure jumps to step 106 to terminate the unnecessary TCS control and to shift the shut-off valve 2 in the valve open position. At step 106, the controller 31 outputs the signal a to the valve 2 to close the valve. Actually, the signal a is generated only when the slip rate is less than a second threshold $S_4$ preset at a smaller value than the threshold $S_3$, in order to avoid chattering of the valve 2.

Subsequently to step 120, or in case of the judgment that the wheel-spin occurs in step 121, step 122 proceeds in which the controller 31 derives a value of pressure to be regulated and controlled by the actuator 1. The controlled pressure value is derived as a minimum pressure value necessary to prevent wheel-spin. In step 123, a test is made to determine whether the command value of controlled pressure is a lower level than a currently-detected master-cylinder pressure. In the event that the command value of controlled pressure is less than the current master-cylinder pressure, it can be judged that the brakes are applied just after initiation of the TCS control. In this case, it is not preferable to control, the brake pressure at a lower pressure level against the driver's own will. Therefore, in case of the affirmative answer at step 123, the control procedure returns to step 106 to terminate the TCS control. Conversely, in case of the negative answer at step 123, that is, when the controlled-pressure command value is less than the current master-cylinder pressure, step 124 proceeds in which a test is made to determine whether the controlled-pressure command value is less than the shut-up master-cylinder pressure stored in the controller 31. In step 124, although it is almost impossible, if the controlled-pressure command value is less than the shut-up master-cylinder pressure, such a condition is abnormal. Under this condition, if the actuator 1 is operated in accordance with the controlled-pressure command value, the actuator will act to reduce the wheel-cylinder pressure on the basis of the command value. To avoid the abnormal TCS control, the control procedure jumps from step 124 to step 106 to temporarily eliminate the necessity of the abnormal TCS control. According to the flow jumping from step 124 to step 106, the shut-off valve 2 is temporarily shifted to the valve open position, with the result that the wheel-cylinder pressure is effectively reduced due to a pressure less than the master-cylinder pressure. After this, when the slip rate exceeds the predetermined threshold $S_3$ at step 105, the TCS control is initiated again. In this case, the TCS control is performed at a pressure intensifying mode, because the wheel-cylinder pressure has been extremely reduced by way of the procedure of steps 106 to 108.

In step 124, when the command value of controlled pressure exceeds the shut-up master-cylinder pressure, the TCS control is operated in the pressure intensifying mode in which the wheel-cylinder pressure is increased to the command value of controlled pressure through steps 125 and 126. In step 125, the value of drive current I applied to the motor 20 is calculated according to the right-half of the graph shown in FIG. 3. In step 126, the motor 20 is driven according to the calculated current value to produce the desired leftward thrust of the worm shaft 24 and consequent to cause the leftward movement of the piston 11. Accordingly, the volume of the variable volume chamber 13 is reduced and as a result the wheel-cylinder pressure is intensified to effectively prevent the wheel-spin until the wheel-cylinder pressure reaches to the controlled pressure value. In this manner, one cycle of the TCS control is brought to an end.

As will be appreciated from the above, when the control procedure jumps to step 106 and flows via step 107 to step 108, upon temporary termination of the ABS control shown in FIG. 5 and the TCS control shown in FIG. 6, the spring-loaded movable spring seat 15 is held in its spring-set position and as a result the piston 11 quickly and precisely returns to its neutral position by way of the fluid pressure acting on the pressure receiving surface of the piston 11, without any thrust acting on the piston through the worm shaft 24. During ABS control, the shut-off valve is first closed in response to the signal b and the volume of the variable volume chamber 13 of the actuator 1 is enlarged in accordance with an increase in the rightward thrust generated by the thrust generator 18, with the result that the wheel-cylinder pressure can be reduced depending on the command value of the controlled pressure determined by the controller. During the TCS control, the shut-off valve is closed in response to the signal b and the volume of the chamber 13 is decreased in accordance with an increase in the leftward thrust caused by the thrust generator, with the result that the wheel-cylinder pressure can be effectively increased depending on the command value of controlled pressure. With the previously-noted arrangement of the actuator 1, since the piston 11 is quickly and precisely positioned in the neutral position after termination of the ABS control and the TCS control, the piston starts to move again from the neutral position upon initiation of a new ABS control or TCS control. This ensures a precise ABS pressure-reduction control and a precise TCS pressure-intensifying control and enhances a response of the ABS control and the TCS control.

Furthermore, since the controller 31 suitably outputs either one of the signals a and b, based on comparison results between the derived slip rate and the two different thresholds $S_1$ and $S_2$ during the ABS control, and based on comparison results between the derived slip rate and the two different thresholds $S_3$ and $S_4$, chattering of the shut-off valve 2 can be effectively avoided.

Moreover, since the controller 31 employed in the brake control system 32 receives the magnitude of the master-cylinder pressure as an input information by way of the pressure sensor 33, the brake control can be faithfully shifted from the TCS control to the normal braking in consideration with the driver's own will, such as a further depression of the brake pedal just after initiation of the TCS control. This eliminates undesirable TCS control. After termination of the TCS, the piston 11 quickly and precisely can return to its neutral position by way of light braking action.

Since the neutral position of the piston 11 is determined by the spring-set position of the spring-loaded movable spring seat 15, the actuator 1 does not require expensive electromagnetic brake and its accessories such as a wire harness and a electromagnetic brake drive circuit. This eliminates some of the problems associated with electromagnetic brakes, such as short-circuits failures of the wire harness. In addition, the magnitude and the acting direction of thrust generated by the thrust generator are respectively determined by a value of current applied to the reversible motor 20 and the flow direction of the applied current. In the absence of the applied current, there is no thrust acting on the piston 11. The piston 11 is quickly and precisely positioned in its neutral position by abutment between the stepped piston rod 14 and the movable spring seat 15. Such an arrangement of the thrust generator is very simple. Additionally, the simple construction of the actuator 1 ensures a precise pressure-reduction operation, a precise pressure-intensifying operation, and quick and precise recovery of the piston to the neutral position. Such quick recovery of the piston to the neutral position may enhance an accuracy of ABS controls which are repeatedly executed during traveling on the high-friction road and the low-friction road arranged alternately to each other.

In the embodiment, only one oil seal 12 is employed in the actuator 1. Reduction of the number of the oil seals assures a high reliability against oil leakage. Similarly, only one shut-off valve 2 and only one piston 11 both employed in the actuator assure a simple construction of the actuator and reduce production costs of the actuator.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A pressure control actuator fluidly disposed in a fluid-pressure line, comprising:
a shut-off valve fluidly disposed in said fluid-pressure line, said shut-off valve being responsive to a valve-open signal for establishing a fluid communication between upstream and downstream lines of said valve, and responsive to a valve-closing signal for blocking said fluid communication and for shutting a fluid pressure in said downstream line;
a pressure-regulation cylinder slidably accommodating therein a piston having a piston rod and cooperative with said piston for defining therein a variable-volume pressure chamber which is fluidly connected to said downstream line;

a thrust generator drivingly connected to said piston for producing a thrust acting on said piston; and spring means for biasing said piston in a first axial direction when said piston is shifted apart from its neutral position in a second axial direction opposite to said first axial direction under a fluid pressure introduced into said chamber so that a volume of said chamber is enlarged, wherein a pre-load of said spring means is set to balance with a force acting on said piston by a maximum fluid pressure introduced into said chamber; and wherein said piston rod comprises a stepped piston rod, and said spring means includes a return spring and a movable annular spring seat formed separate from said stepped piston rod and having an outside diameter greater than an inside diameter of a radially inwardly projecting annular shoulder formed on an inner wall of said cylinder so that said spring seat is spring-loaded against said annular shoulder by said pre-load of said spring, and an outside diameter of a larger diameter section of said piston rod is dimensioned to be greater than an inside diameter of said annular spring seat so that said piston is positioned in the neutral position by abutment between said larger diameter section of said stepped piston rod and said spring seat abutting with said shoulder.

2. The pressure control actuator as set forth in claim 1, wherein said shut-off valve comprises an electromagnetic solenoid-type two-port two-position, normally-open valve, and said thrust generator comprises a motor-driven thrust generator which produces both a thrust acting in said first axial direction and a thrust acting in said second axial direction and has a drive shaft rigidly connected to a piston rod of said piston.

3. The pressure control actuator as set forth in claim 2, wherein said piston, said stepped piston rod, said movable spring seat, said spring, and said drive shaft are axially aligned to each other.

4. An automotive brake control system comprising:

a master cylinder generating a master-cylinder pressure depending on a depression of a brake pedal;

a wheel cylinder attached to each of road wheels, for converting said master-cylinder pressure to a brake force;

a slip-rate detection means for detecting a slip rate of the road wheel;

a motor-driven pressure control actuator, said actuator including:

an electromagnetic solenoid-type shut-off valve fluidly disposed in a brake-fluid line, said shut-off valve having a first port communicating with said master cylinder via an upstream line and a second port communicating with said wheel cylinder via a downstream line, and said shut-off valve being responsive to a valve-open signal for establishing a fluid communication between the two ports, and responsive to a valve-closing signal for blocking said fluid communication and for shutting said master-cylinder pressure in said downstream line;

a pressure-regulation cylinder slidably accommodating therein a piston having a piston rod and cooperative with said piston for defining therein a variable-volume pressure chamber which is fluidly connected to said downstream line;

a reversible motor-driven thrust generator drivingly connected to said piston for producing a thrust acting on said piston; and spring means for biasing said piston in a first axial direction when said piston is shifted apart from its neutral position in a second axial direction opposite to said first axial direction under said master-cylinder pressure introduced into said chamber so that a volume of said chamber is enlarged, a pre-load of said spring means being set to balance with a force acting on said piston by a maximum master-cylinder pressure introduced into said chamber;

a brake controller responsive to a driving condition of a vehicle, for controlling the valve position of said valve and a direction and a magnitude of said thrust produced by said thrust generator;

wherein said brake controller generates said valve closing signal to shift said valve to the valve-closed position when the detected slip rate exceeds a predetermined first threshold, and generates said valve-open signal when the detected slip rate is less than a predetermined second threshold preset at a smaller value than said first threshold; and wherein said piston rod comprises a stepped piston rod, and said spring means includes a return spring and a movable annular spring seat formed separate from said stepped piston rod and having an outside diameter greater than an inside diameter of a radially inwardly projecting annular shoulder formed on an inner wall of said cylinder so that said spring seat is spring-loaded against said annular shoulder by said pre-load of said spring, and an outside diameter of a larger diameter section of said piston rod is dimensioned to be greater than an inside diameter of said annular spring seat so that said piston is positioned in the neutral position by abutment between said larger diameter section of said stepped piston rod and said spring seat abutting with said shoulder.

5. The automotive brake control system as set forth in claim 4, wherein when the detected slip rate exceeds said first threshold, in addition to shifting to the valve-closing position, said controller controls said thrust generator to produce a thrust acting on said piston in said second axial direction so that said wheel-cylinder pressure is reduced according to an increase in the volume of said chamber.

6. The automotive brake control system as set forth in claim 5, wherein when the detected slip rate exceeds said first threshold, in addition to shifting to the valve-closing position, said controller controls said thrust generator to produce a thrust acting on said piston in said first axial direction so that said wheel-cylinder pressure is increased according to a decrease in the volume of said chamber.

* * * * *